United States Statutory Invention Registration [19]

[11] Reg. Number: H392

Staehlin

[43] Published: Dec. 1, 1987

[54] MICROWAVE WAVEGUIDE MANIFOLD AND METHOD

[75] Inventor: John H. Staehlin, Lutherville, Md.

[73] Assignee: The United States of America as represented by the Secretary of the Air Force, Washington, D.C.

[21] Appl. No.: 36,524

[22] Filed: Apr. 9, 1987

[51] Int. Cl.[4] ..... H01P 5/12

[52] U.S. Cl. ..... 333/114

*Primary Examiner*—Stephen C. Buczinski
*Assistant Examiner*—Linda J. Wallace
*Attorney, Agent, or Firm*—Gerald B. Hollins; Donald J. Singer

[57] ABSTRACT

A controllably electrically coupled, physically intersecting plural waveguide manifold assembly wherein the intersecting waveguide elements are fabricated in integral unitary relationship from a single piece of metal in order to avoid the inaccuracies and difficult-to-control fabrication steps associated with uniting separate waveguide elements into a unitary structure. An X-band aluminum airborne radar manifold example is disclosed, along with a fabrication sequence for the manifold and the electrical energy communicating apertures joining the manifold elements.

10 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

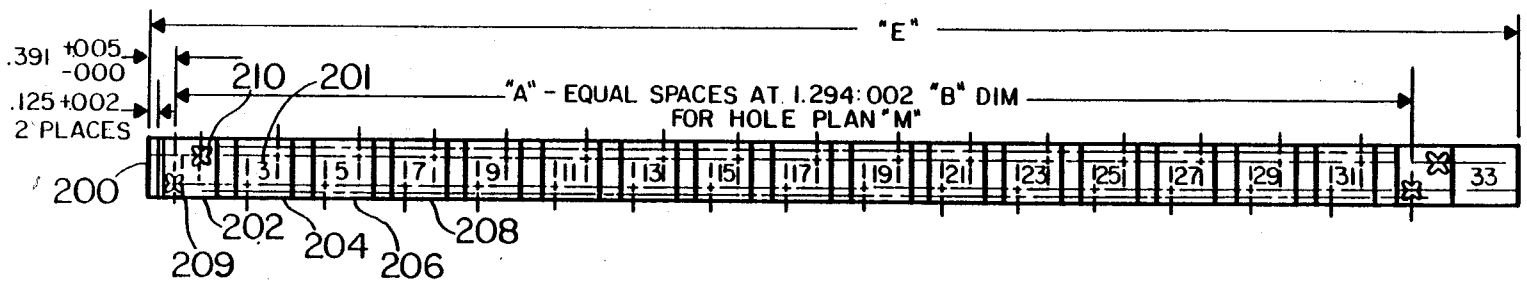
Fig. 2A
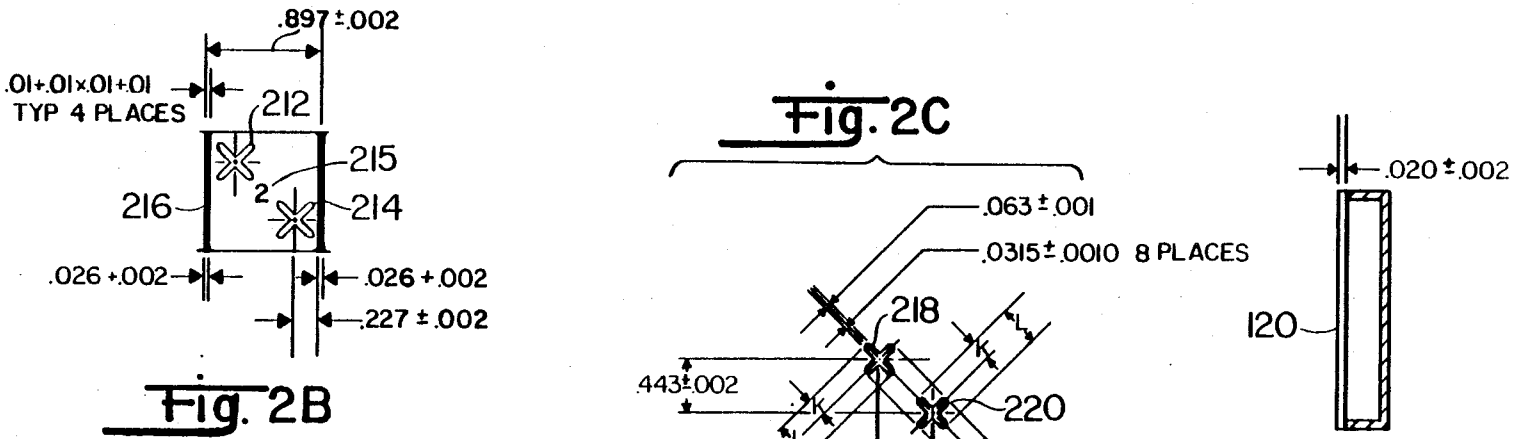
Fig. 2B
Fig. 2C
Fig. 2D
Fig. 2E

MICROWAVE WAVEGUIDE MANIFOLD AND METHOD

RIGHTS OF THE GOVERNMENT

The invention described herein may be manufactured and used by or for the Government of the United States for all governmental purposes without the payment of any royalty.

This invention relates to the field of microwave radio frequency waveguides of the intersecting or tapped or energy dividing type and to fabrication arrangements therefor.

In coupling microwave radio frequency energy to or from an antenna of the phased array type, there is frequently a need for microwave energy transmitting elements which can divide the signal energy from a microwave source into a plurality of signals of known amplitude and phase relationship. Conversely, it is often desirable to combine a plurality of signals having predetermined phase and amplitude relationships into a single signal in phased array antennas or other electronic devices. Antennas of this type may, for example, include the electronically alterable or steerable antennas which are used to move an electromagnetic pattern physically through a scanned region of space. Other uses for electromagnetically coupled, physically intersecting waveguide segments are also known in the electronic art.

Heretofore, electromagnetically coupled, physically intersecting waveguide segments have been achieved through a variety of arrangements, which includes the physical uniting of two intersecting manifold component segments through the use of fusible metal, that is, through the use of soldering, brazing or welding—especially while the two waveguide component segments are retained in a desired physical relationship by a jig or other physical restraint. Frequently in these prior arrangements, an opening which closely conforms to the exterior cross-sectional shape of the intersecting waveguide is made in one of the waveguides and then a united bead of fusible metal is formed on the interior and/or exterior surfaces of the mated waveguide elements. In such a waveguide manifold, some exterior surface area of one waveguide member is therefore exposed and viewable from within the intersecting waveguide member. With this intersecting waveguide arrangement, apertures of a predetermined shape, size, and location may be disposed in the waveguide segment that is common to both the primary and intersecting or secondary waveguide in order that predetermined electrical energy coupling or communication between the two waveguides occur.

As may be appreciated by persons skilled in the microwave art, the shapes and contours achieved in an intersecting electrically coupled waveguide made according to this prior arrangement assume considerable significance with respect to the electrical properties of the waveguide manifold structure. Factors such as the relative alignment of the two waveguides, the relative dimension of the fusible metal fillets and beads formed, the size, shape, and location of the waveguide coupling apertures, and the close physical proximity of the structural integrating bead material to the energy coupling apertures become important with respect to the electrical behavior of the intersecting waveguides. Conversely stated, in many coupled waveguide structures, the physical fabrication tolerances attainable are incompatible with the desired electrical properties of the manifold to a degree requiring more than routine attention. In particular, mechanically desirable fit tolerances, joining technique allowances (such as brazing material gaps, fillet variations, and surface perturbations) are troublesome in achieving optimum predicted electrical performance from such an electrically coupled, intersecting waveguide manifold apparatus.

SUMMARY OF THE INVENTION

In the present invention, the predicted waveguide manifold electrical performance is achieved through attainment of precise mechanical dimensions in the manifold structure. According to the invention, this performance is moreover achieved without the use of fusible metal attachment of the waveguide segments and with the maintenance of precise dimensions through the the use of machine cutting tools, preferably machine tools of the numerically controlled type in forming the manifold.

An object of the invention is therefore, to consistently obtain the theoretically predictable performance from an electrically coupled, physically intersecting waveguide manifold.

Another object of the invention is to realize the advantages of machine tool precision dimensions in an electrically coupled, physically intersecting waveguide manifold assembly.

Another object of the invention is to provide an electrically coupled, physically intersecting waveguide manifold assembly which can be conveniently minimized as to overall mass.

Another object of the invention is to provide a waveguide manifold assembly which is adaptable to a variety of configurations involving, for example, a differing number of cross waveguide members or differing operating frequencies.

Another object of the invention is to provide an electrically coupled, physically intersecting waveguide manifold assembly which can be used with phase shifters and other microwave hardware elements in achieving microwave electrical signal coupling according to a variety of different electrical algorithms.

Additional objects and features of the invention will be understood from the following description and the accompanying drawings.

These and other objects of the invention are achieved by microwave radio frequency waveguide manifold apparatus including the combination of a first microwave energy transmitting metallic waveguide member having a first unitary metal body portion of predetermined first cross-sectional shape and a first metal closure member matable with said first body portion to form a first closed cross-section wavequide, a second microwave energy transmitting metallic waveguide member having a second unitary metal body portion of predetermined second cross-sectional shape adjacently and angularly crossover disposed of the first waveguide first crosssectional shape, the second waveguide member also including a second metal closure member matable with the second body portion to form a second closed cross-section waveguide, aperture means of predetermined shape, size, and waveguide residence location communicating between the first and second waveguide cross-sectional shapes through a crossover region common to each of the waveguides and for conveying microwave energy of predetermined electrical signal relationship between the waveguides, the manifold first and second waveguide body portions and the crossover region common thereto comprising an integral single common piece of electrically conductive metal, whereby the predetermined electrical signal relationwhip within the waveguides is achieved and maintained free of inter-waveguide mechanical dimension variables, including fitting tolerances, joining technique allowances, fillet variations and fusing metal gaps.

BRIEF DESCRIPTION OF THE DRAWINGS

FIGS. 2A–2E show additional details of the FIG. 1 waveguide manifold assembly.

DETAILED DESCRIPTION

Figures 1, 1A:
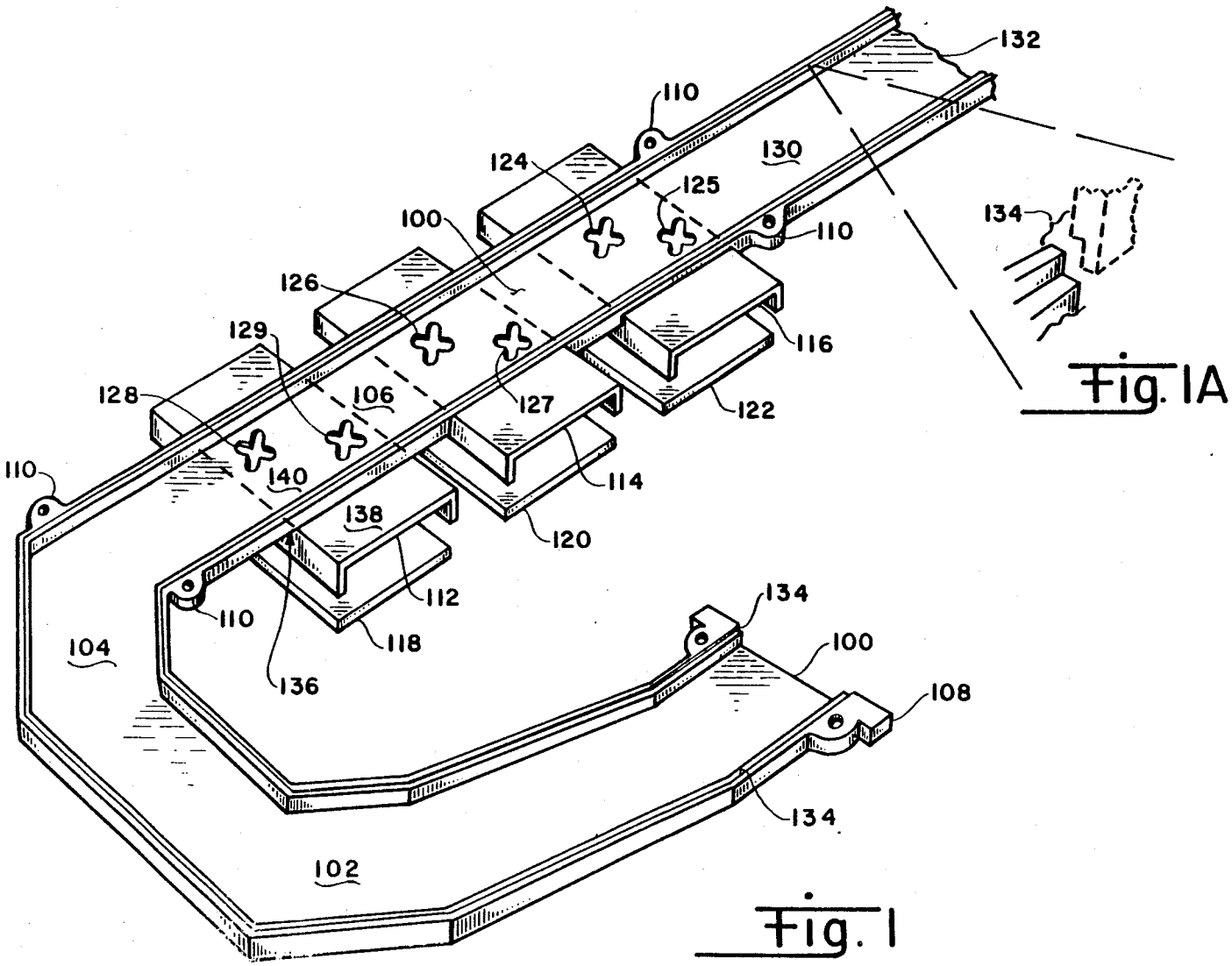
FIG. 1 shows an isometric view of the lower half of a waveguide manifold assembly made in accordance with the invention.

FIG. 1 in the drawings shows the lower half of an electrically coupled, physically intersecting waveguide manifold assembly such as might be used with an X-band phased array antenna in an airborne radar system. The FIG. 1 waveguide assembly may be used, for example, to accomplish energy coupling between radiating elements of an antenna and a source or sink-receptor of microwave radio frequency energy. A mating mirror image top half of the FIG. 1 waveguide manifold, a closure member for the FIG. 1 apparatus, is presumed to exist, and may also have attached cross waveguide members, but is not shown in FIG. 1. Upper and lower halves of the FIG. 1 waveguide assembly are intended to fit together tightly by way of the rabbet joint structure indicated at 134 in FIG. 1 and as is illustrated in the FIG. 1A drawing view. The FIG. 1 waveguide half assembly includes a primary half waveguide member 100 which includes the two 90° turn sections 102 and 104, the input flange 108, the alignment lugs 110, and the three cross waveguides 112, 114 and 116. The cross waveguides 112, 114 and 116 further receive the closure members or cover plates 118, 120 and 122 which are intended for attachment to the cross waveguides in completion of the cross waveguide rectangular cross-section.

The straightaway portion 106 of the primary waveguide member 100 is shown in FIG. 1 to be provided with a plurality of microwave energy coupling apertures 124, 125, 126, 127, 128, and 129, by which predetermined amounts of energy are coupled between the primary waveguide member 100 and each of the cross waveguide members 112, 114 and 116. Additional cross waveguide members and energy coupling apertures may be incorporated into the continuing portion 130 or other parts of the waveguide 100.

Some previous arrangements for achieving a waveguide manifold structure of the FIG. 1 type call for cutting away one of the broad face surfaces of the waveguide 100 or the waveguide 112 in the region of their intersection, that is, in the region 140 in FIG. 1, in order that an attachment between the waveguides may be achieved using brazing, soldering, welding, or similar fusion metal attachment arrangements. According to this practice, the lower face of the waveguide 100 might, for example, be cut away in the region 140 so that the surface 138 of the waveguide 112 would be visible within the confines of the primary waveguide 100 in FIG. 1. Alternately, of course, the cutting away could be accomplished in the surface 138 of the waveguide 112 so that the appearance of the manifold would again resemble that shown in FIG. 1. In either of these prior arrangements, however, practical limitations are incurred in obtaining precise fillet shapes, precise alignment positions, uniform attachment bead sizes and gap-free beads. The fused metal forming attachments have been found to be an important influence on the electrical characteristics of the waveguide assembly. Moreover, these factors are frequently so difficult to predict and control in a production environment that the value of fused attachment between waveguides in a manifold assembly of the FIG. 1 type is called into question.

A notable aspect of the present invention therefore calls for the waveguides 100, 112, 114, and 116, to be fabricated from a single unitary piece of metal. By way of this unitary fabrication of the FIG. 1 apparatus, the mechanical dimensions of the waveguide elements and their intersecting regions can be precisely controlled. In a unitary fabricated manifold assembly such considerations as waveguide intersection surface roughness variations, fillet dimension variations, brazing material gaps, fit tolerances, waveguide alignments, and other practical implications of a two-part attached structure are inherently avoided.

According to a further aspect of this unitary fabricating concept, in a non-cutaway arrangement of the intersecting waveguides 100 and 112, at the region 136 in FIG. 1, the space between the surface 138 and the plane of the interior surface of the waveguide 100, may be varied in accordance with the depth or length desired in the apertures 124—129. Variations of aperture length may therefore in this arrangement be used as another variable that is usable to determine the electrical properties of the waveguide manifold assembly. In a broad concept of a unitary structure embodiment of the FIG. 1 apparatus, therefore, the waveguide sections 112, 114 and 116 may be separated from, that is, hang below the waveguide 100, or alternately, may be disposed to be intersecting with the waveguide 100 in nature or may be arranged in any intermediate relationship between these extremes. The absence of appearance of the cross waveguide surface 138 within the region 140 of the primary waveguide 100 in FIG. 1 implies, of course, the continuous nature of the straightaway portion 106 of the waveguide 100 and either the cutting away of the cross wave guide members 112, 114 and 116 in FIG. 1 or a separated non-intersecting disposal of these waveguides in the FIG. 1 manifold assembly.

The FIG. 1 waveguide manifold assembly is preferably fabricated from aluminum metal when used in an airborne, X-band radar apparatus and is in addition fabricated to have minimum wall thicknesses in the range of twenty thousandths of an inch (0.020 inch). Both of these attributes are in the interest of minimizing the weight to be carried by the host aircraft. With aluminum fabrication of the FIG. 1 apparatus, the rabbet joinings 134 between top and bottom halves of the primary waveguide 100, and the joining of the cover plate members 118, 120 and 122 to the cross waveguide members 112, 114 and 116, may be accomplished with a dip brazing process wherein temperatures near the melting point of aluminum are employed. Other joining techniques, other Waveguide fabrication materials, other operating frequencies and use of the waveguide manifold assembly outside of the airborne radar art are, of course, within contemplation of the invention.

In a similar manner, other arrangements of the FIG. 1 manifold assembly may totally eliminate the input flange and/or the alignment lugs 110 and 112—especially in view of the alignment promoting rabbet joint structure 134 and with the use of other waveguide-to-source or waveguide-to-waveguide endwise coupling arrangements which are known in the art. Endwise coupling of the cross waveguide sections 112, 114 and 116 to additional waveguide structures or to other radio frequency apparatus is not shown in the FIG. 1 apparatus but is presumed. Additionally the double half depth construction of the primary waveguide member 100 in the FIG. 1 apparatus, and the flat coverplate to full depth arrangement of the cross waveguide members 112, 114 and 116 are all typical and representative of other arrangements which are known in the microwave art.

Other details of the FIG. 1 electrically coupled, physically intersecting waveguide manifold assembly are shown in FIG. 2 of the drawings; the FIG. 2 details relate particularly to the straightaway portion 106 and to the cross waveguide members 112, 114 and 116 in the FIG. 1 apparatus. In FIG. 2, which includes the views of FIGS. 2A, 2B, 2C, 2D and 2E, numeric dimensional examples and other details relating to an X-band embodiment of the FIG. 1 apparatus are indicated. Specifically, the FIG. 2A view of FIG. 2 shows a waveguide straightaway portion 200 which is similar to the straightaway portion 106 of the waveguide 100 in FIG. 1. The FIG. 2A straightaway portion 200 is divided by a number of possible cross waveguide locations which are indicated typically at 202, 204, 206 and 208. These indicated cross-waveguide locations each include possible residences for waveguide energy coupling apertures, as are indicated at 209 and 210. Possible aperture residences are also indicated generically in FIG. 2A by the crossed center lines in the waveguide locations 204, 206, 208 and so on, and are identified in pairs with the numbers 1, 3, 5, 7 and 9 and so on, as indicated at 201. The adjacent possible waveguide residences 209 and 210 are spaced apart by substantially one-half wavelength of the radio frequency energy to be transmitted by the waveguide straightaway portion 200. Certain of the pertinent dimensions for the waveguide portion 200 in FIG. 2A are indicated in the FIG. 2A drawing, notably the location of the end residence; as are certain dimensions for additional details shown in FIGS. 2B–2E of the FIG. 2 drawing. Numerical values are given for these dimensions together with practical tolerances for these numeric values. In addition to these numeric values, certain of the dimensions in FIG. 2A and FIG. 2C of FIG. 2 are represented by alphabetical letters, such dimensions are dependent upon the selected operating freguency band for the FIG. 2 apparatus, as is known in the microwave art.

Location and dimensioning of the preferred form of the apertures 124–129 for X-band usage of the invention are indicated in the views of FIGS. 2B and 2C in the FIG. 2 drawing. In FIG. 2B, the aperture locations at 212 and 214 are shown with respect to the width and wall thickness dimension of a cross waveguide member section 216, the cross waveguide member section 216 being intended for mounting on the opposite face of the waveguide straightaway portion 200, as is indicated by the even numbered identification shown at 215 in FIG. 2B and the "reversed" aperture locations shown in FIG. 2B with respect to the locations shown in FIG. 2A.

The views of FIGS. 2C and 2E in the FIG. 2 drawing show additional details of the preferred cross shaped configuration of the waveguide connecting apertures, at 218 and 220 in FIG. 2C; a cross-sectional representation of the aperture 218 is shown in FIG. 2E.

The view of FIG. 2D in FIG. 2 shows the overall cross-section of a cross waveguide member made in accordance with the coverplate closure member concept shown in FIG. 1 of the drawings: the FIG. 2D view indicates the above-described nominal metal thickness for the coverplate member 120.

Figure 3:
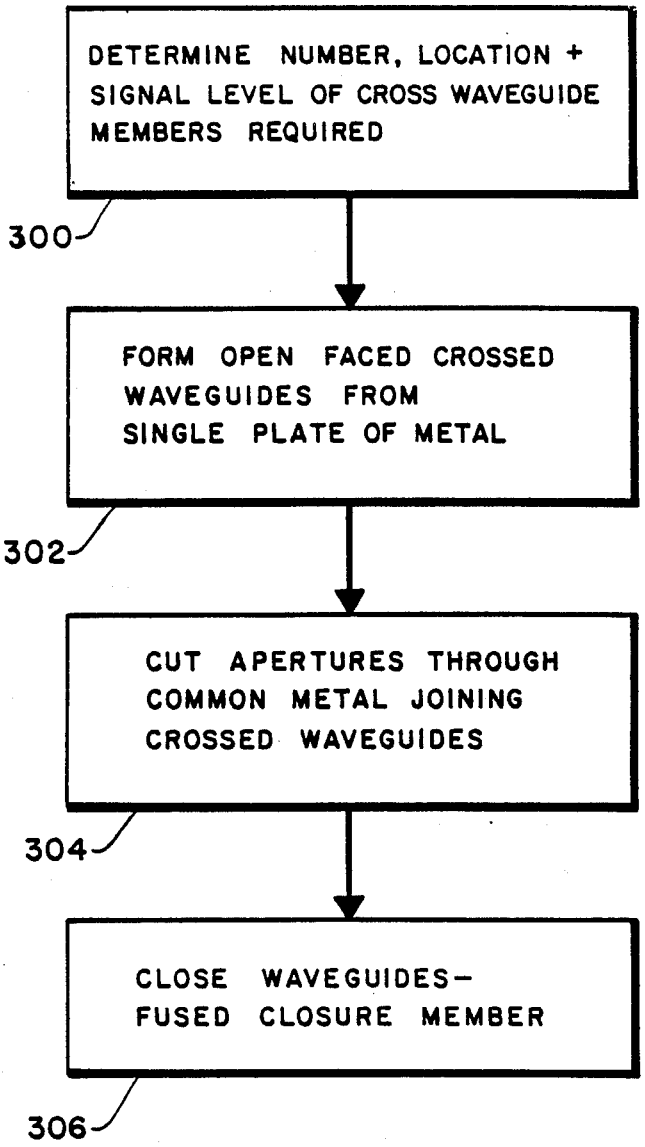
FIG. 3 shows a sequence for fabricating waveguide manifold assemblies of the FIG. 1 type.

FIG. 3 in the drawings shows a sequence for fabricating an electrically coupled, physically intersecting waveguide manifold assembly of the type shown in FIGS. 1 and 2. The FIG. 3 sequence includes a determination of desired electrical properties for the manifold assembly and a relation of these electrical properties to the number of, location of, and signal characteristics of cross waveguide members, as is indicated at block 300 in FIG. 3. Formation of the waveguide straightaway portion 106 and the integral cross wavequide members 112, 114 and 116 all from a single piece of metal is indicated in the block 302 of FIG. 3. Formation of the intersecting waveguide elements from a single piece of metal by such technique as machining or casting that is followed by machining indicated in the block 302.

Machining, cutting, or finishing of the apertures 124–129 is indicated at block 304 in the FIG. 3 sequence, such machining being performed on whatever depth of metal is selected between the intersecting waveguide portions, as is described above in connection with the region 136 in FIG. 1. Closure of the waveguides with fused metal, as is described in connection with the rabbet joint 134 and attachment of the coverplates 118, 120 and 122, is indicated in the block 306 of FIG. 3.

The present invention therefore provides for improved physical realization of intended electrical properties in an electrically coupled, physically intersecting waveguide manifold assembly while also affording reasonable manufacturing cost, improved repeatability of electrical properties between separate manifold assemblies, and other significant advantages.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Microwave radio frequency waveguide manifold apparatus comprising the combination of:

a first microwave energy transmitting metallic waveguide member having a first unitary metal body portion of predetermined first cross sectional shape and a first metal closure member matable with said first body portion to form a first closed cross section waveguide;

a second microwave energy transmitting metallic waveguide member having a second unitary metal body portion of predetermined second cross sectional shape disposed adjacent and angularly crossover intersecting of said first waveguide first cross sectional shape, said second waveguide member also including a second metal closure member matable with said second body portion to form a second closed cross section waveguide; and aperture means, of predetermined shape, size and waveguide residence location, communicating between said first and second waveguide cross sectional shapes through a crossover region common to each said waveguide for conveying microwave energy of predetermined electrical signal relationship between said waveguides;

said first and second waveguide body portions and said crossover region common thereto comprising a unitary single common piece of electrically conductive metal;

whereby said predetermined electrical signal relationship within said waveguides is achieved and maintained free of inter-waveguide mechanical dimension variables including fitting tolerances, joining technique allowances, fillet variations, and fusing metal gaps.

2. The apparatus of claim 1 wherein said waveguides comprise a portion of a phased array antenna apparatus.

3. The apparatus of claim 1 wherein said body portion closure members are attached to said body portions by fused metal of lower melting point than said body portions and closure member metals.

4. The apparatus of claim 1 wherein said waveguide body portions have rectangular cross-sectional shapes and wherein said crossover region is located in a long cross section leg of each said waveguide cross-section shape.

5. The apparatus of claim 1 further including a third microwave energy transmitting metallic waveguide member having a third unitary metal body portion of predetermined cross-sectional shape adjacently and angularly crossing over said first waveguide, said third waveguide member also including a closure member matable with said third body portion to form a third closed cross-section waveguide and aperture means communicating with said first waveguide member.

6. The method of making a microwave radio frequency energy coupled intersecting waveguide manifold comprising the steps of:

determining from the required electrical and physical characteristics of the manifold the number of and the physical location of the cross waveguide members required therein;

forming an open-faced body portion comprising a manifold primary waveguide member and each intersecting cross waveguide member from a unitary plate of metal, the locating of each said cross waveguide member along said primary waveguide being in response to said determining step;

cutting electrical energy coupling apertures of predetermined size, shape, and physical location in the plate metal locations joining said primary waveguide with each said cross waveguide; and fusing waveguide closure members over said open face body portions of said waveguides;

whereby predetermined size, shape, and location alignment of said apertures with respect to each said waveguide is attained and maintained.

7. The method of claim 6 wherein said forming step includes machining.

8. The method of claim 7 wherein said cutting step also includes machining.

9. The method of claim 8 wherein said machining includes numerically controlled machining.

10. The method of claim 9 wherein said fusing step includes one of the steps of brazing and soldering.

* * * * *